United States Patent
Faruque

(10) Patent No.: US 10,343,574 B2
(45) Date of Patent: Jul. 9, 2019

(54) GLOVE BOX DOOR ASSEMBLY

(71) Applicant: Ford Global Technologies, LLC, Dearborn, MI (US)

(72) Inventor: Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/407,817

(22) Filed: Jan. 17, 2017

(65) Prior Publication Data
US 2018/0201172 A1 Jul. 19, 2018

(51) Int. Cl.
| | |
|---|---|
| *B60N 3/00* | (2006.01) |
| *B60R 7/04* | (2006.01) |
| *B60R 7/06* | (2006.01) |
| *E05D 7/12* | (2006.01) |
| *F16C 29/00* | (2006.01) |
| *F16C 35/02* | (2006.01) |

(52) U.S. Cl.
CPC ............ *B60N 3/002* (2013.01); *B60R 7/04* (2013.01); *B60R 7/06* (2013.01); *E05D 7/121* (2013.01); *F16C 29/005* (2013.01); *F16C 35/02* (2013.01); *E05Y 2900/53* (2013.01); *F16C 2326/01* (2013.01)

(58) Field of Classification Search
CPC .......... B60N 3/001; B60N 3/002; B60R 7/04; B60R 7/06; E05D 7/121; E05Y 2900/538
USPC .................. 296/37.1, 37.13, 37.16
See application file for complete search history.

(56) References Cited

U.S. PATENT DOCUMENTS

| 2,382,011 | A | * | 8/1945 | Howard ................. | B60N 3/002 224/483 |
|---|---|---|---|---|---|
| 2,592,032 | A | | 4/1952 | Henderson | |
| 2,789,861 | A | * | 4/1957 | Hudson .................. | B60N 3/002 108/134 |
| 3,386,765 | A | * | 6/1968 | Drach, Jr. .............. | B60R 7/06 296/37.12 |
| 3,473,680 | A | * | 10/1969 | Downer ................ | B60R 11/06 224/311 |
| 3,503,648 | A | * | 3/1970 | James .................... | B60N 3/102 296/37.12 |
| 3,606,112 | A | * | 9/1971 | Cheshier ............... | B60N 3/08 108/143 |
| 3,899,982 | A | * | 8/1975 | Fetzek .................. | A47B 31/06 108/143 |
| 4,099,814 | A | * | 7/1978 | Hasselberger ........ | B60N 3/102 108/92 |
| 4,105,246 | A | * | 8/1978 | Trumbull ............... | B60J 3/00 296/97.7 |

(Continued)

FOREIGN PATENT DOCUMENTS

| DE | 102007052975 A1 | 5/2009 |
|---|---|---|
| DE | 202016102329 U1 | 7/2016 |

(Continued)

*Primary Examiner* — Gregory A Blankenship
(74) *Attorney, Agent, or Firm* — Vichit Chea; Brooks Kushman, P.C.

(57) ABSTRACT

A vehicle glove box assembly may include a glove box defining a compartment, a door arranged on the glove box moveable between open and closed positions, and a tray assembly arranged on and hinged to the door and pivotable with respect to the door to provide a flat surface in a deployed position.

11 Claims, 2 Drawing Sheets

(56) References Cited

U.S. PATENT DOCUMENTS

| | | | | |
|---|---|---|---|---|
| 4,423,812 | A * | 1/1984 | Sato | G11B 23/0236 206/387.1 |
| 4,902,061 | A | 2/1990 | Plavetich et al. | |
| 5,143,337 | A * | 9/1992 | Tomayko, Jr. | B60N 3/002 108/44 |
| 5,207,471 | A * | 5/1993 | Mutschler | B60R 11/0235 296/37.12 |
| 5,520,313 | A * | 5/1996 | Toshihide | B60N 2/4686 220/815 |
| 5,632,520 | A | 5/1997 | Butz | |
| 6,095,060 | A * | 8/2000 | Ma | B60N 3/002 108/44 |
| 6,206,442 | B1 | 3/2001 | Breunig | B60N 3/104 296/208 |
| 6,598,921 | B2 | 7/2003 | Seel et al. | |
| 6,663,155 | B1 * | 12/2003 | Malone | B60R 11/0229 224/539 |
| 6,929,304 | B1 * | 8/2005 | Dry | A47C 7/72 224/539 |
| 7,114,755 | B1 * | 10/2006 | Sturt | B60N 3/102 296/24.34 |
| 7,147,259 | B2 * | 12/2006 | Radu | B60N 2/46 224/275 |
| 7,192,070 | B2 * | 3/2007 | Radu | B60N 2/4606 296/1.09 |
| 7,413,229 | B2 * | 8/2008 | Kukucka | B60N 2/4646 296/1.09 |
| 8,419,102 | B2 | 4/2013 | Takemura | |
| 8,714,093 | B2 * | 5/2014 | Rigner | B60R 7/06 108/45 |
| 2005/0218681 | A1 * | 10/2005 | DePue | B60N 3/002 296/37.12 |
| 2006/0107877 | A1 * | 5/2006 | Sturt | A47B 5/00 108/44 |
| 2011/0140472 | A1 * | 6/2011 | Vander Sluis | B60R 7/04 296/24.34 |
| 2017/0267184 | A1 * | 9/2017 | Huebner | B60R 7/06 |
| 2018/0201172 | A1 * | 7/2018 | Faruque | B60N 3/002 |

FOREIGN PATENT DOCUMENTS

| | | |
|---|---|---|
| FR | 2873971 A1 | 2/2006 |
| IT | RM940498 A1 | 2/1995 |
| KR | 19970038647 A | 7/1997 |

\* cited by examiner

GLOVE BOX DOOR ASSEMBLY

TECHNICAL FIELD

Disclosed herein are glove box door assemblies.

BACKGROUND

Vehicles may include glove box compartments built into a dashboard at the passenger side seat for storing items.

SUMMARY

A vehicle glove box assembly may include a glove box defining a compartment, a door arranged on the glove box moveable between open and closed positions, and a tray assembly arranged on and hinged to the door and pivotable with respect to the door to provide a flat surface in a deployed position.

A glove box door assembly may include a door arranged on a glove box and moveable between open and closed positions, and a tray assembly arranged on and hinged to the door and pivotable with respect to the door to provide a flat surface in a deployed position.

A glove box door assembly may include a door assembly for a glove box including a door arranged on the glove box and moveable between open and closed positions, and the door assembly further including a tray assembly arranged on and pivotable with respect to the door and including a tray to provide a flat surface in a deployed position, the tray including a release mechanism configured to disengage the door assembly from the glove box.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Passenger seat occupants may desire a convenient platform to place electronic devices such as laptops, tablets, etc., in order to use these devices during vehicle use. However, available aftermarket trays are often aesthetically unpleasing and may lack durability and stability. Disclosed herein is a tray assembly arranged on a glove box door. The tray assembly may abut the glove box door in a stored position and pivot away from the glove box door in a deployed position to form a horizontal flat surface for the passenger. The tray may be laterally extendable and retractable on an adjustable track.

Figure 1:
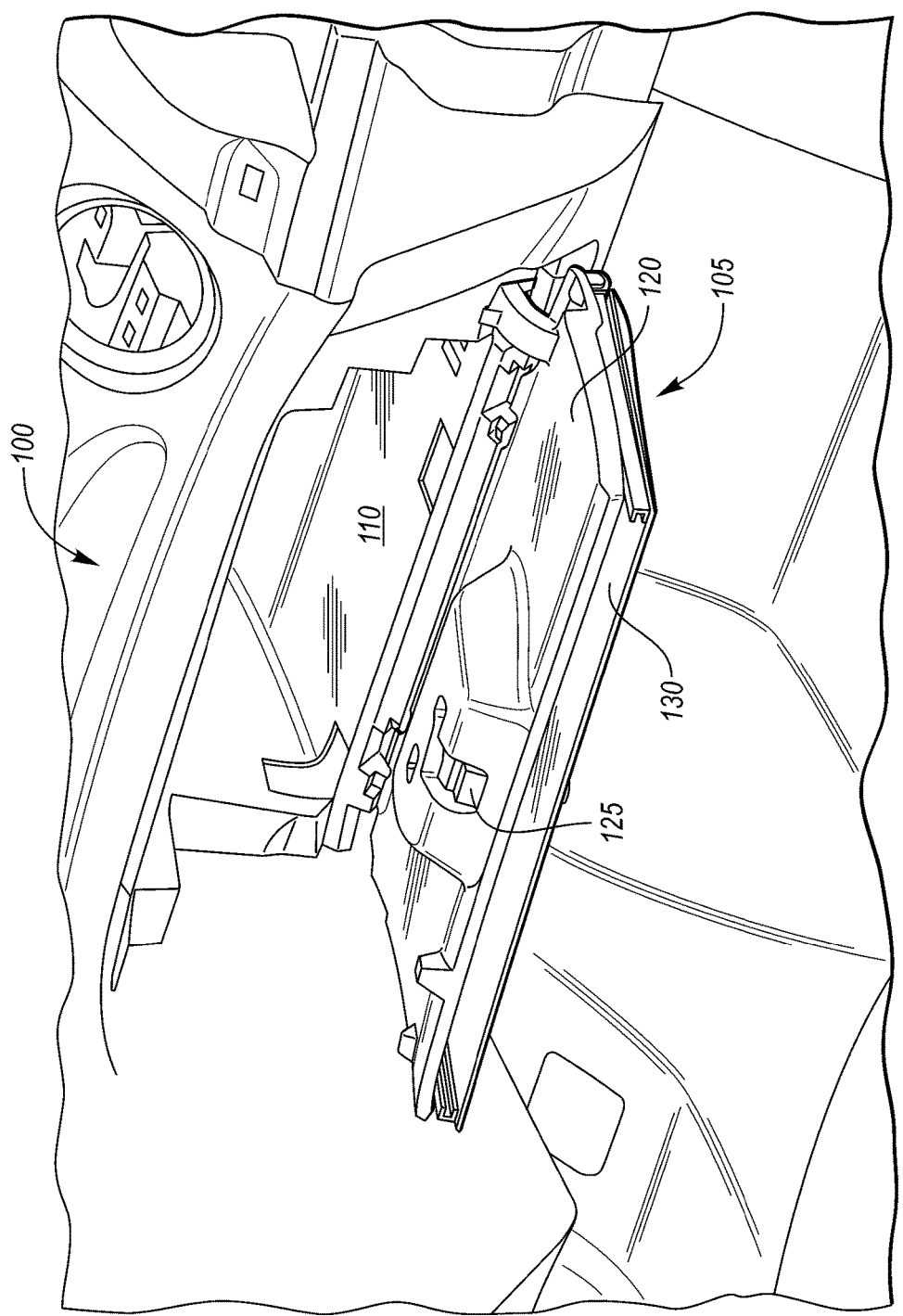
FIG. 1 is a perspective view of an example glove box assembly having a door assembly in an open position.

FIG. 1 is a perspective view of an example of a glove box assembly 100 having a door assembly 105 in an open position. The glove box assembly 100 may be a glove box or glove compartment included in a motor vehicle. The glove box may be arranged within the dash board in front of a passenger seat, though the glove box assembly disclosed herein may be implemented in other parts of the vehicle.

The glove box assembly 100 defines a compartment 110 configured to receive and store items such as user's manuals, vehicle registrations, personal items such as gloves, umbrellas, etc. The door assembly 105 is configured to move from an open position, allowing a user access to the compartment 110, to a closed position to seal the compartment 110 and the contents therein.

The door assembly 105 includes a door 120 configured to seal, or close access to, the compartment 110. The door 120 may abut the glove box assembly 100. The door 120 may be moveable between the open and closed positions to close or open the compartment 110. The door 120 may include a door release mechanism 125. The door release mechanism 125 may include a latch configured to engage a portion of the compartment 110 and maintain the door 120 in the closed position. The door release mechanism 125 may also be a push-push latch or a push-release mechanism whereby applying pressure to the mechanism releases the engagement with the compartment 110, allowing the door 120 to open. In one example, the door release mechanism 125 may be arranged on the door 120. In another example, the door release mechanism may be arranged on a tray 155, as discussed in more detail below with respect to FIG. 2.

The door assembly 105 may include a tray assembly 130 arranged adjacent and attached to the door assembly 105 on a side of the door 120 opposite the compartment 110. The tray assembly 130 may provide a flat horizontal surface to a passenger while the door 120 remains in the closed position. The tray assembly is discussed in more detail with respect to FIG. 3.

Figure 2:
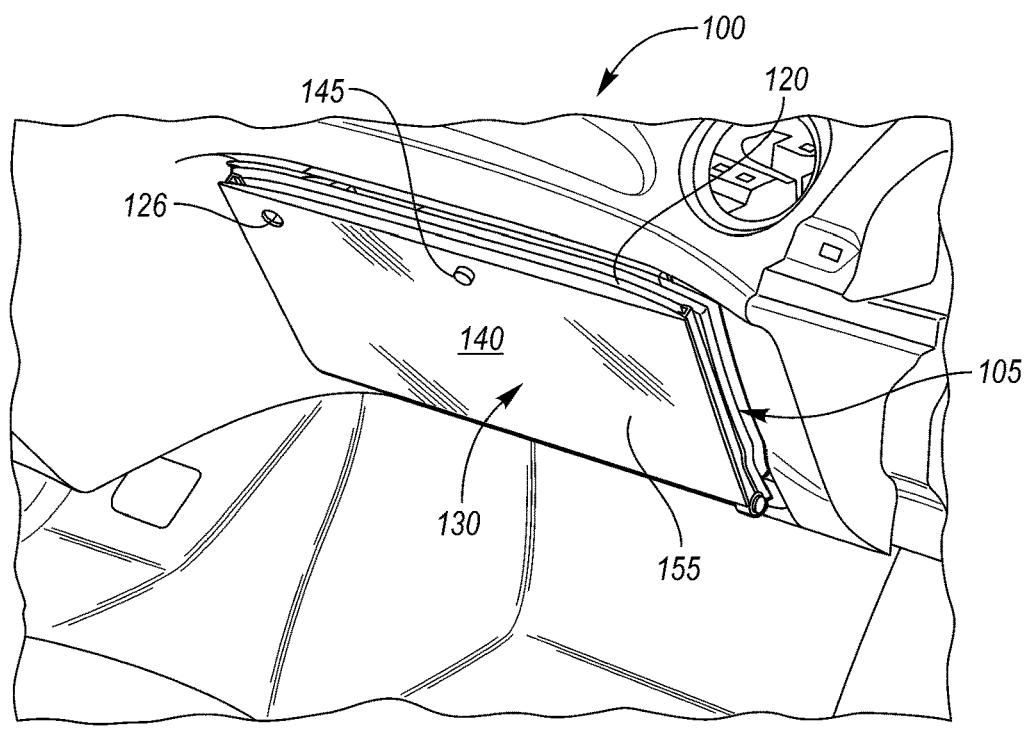
FIG. 2 is a perspective view of the glove box assembly of FIG. 1 having the door assembly in a closed position and the tray assembly in a stored position.
Figure 3:
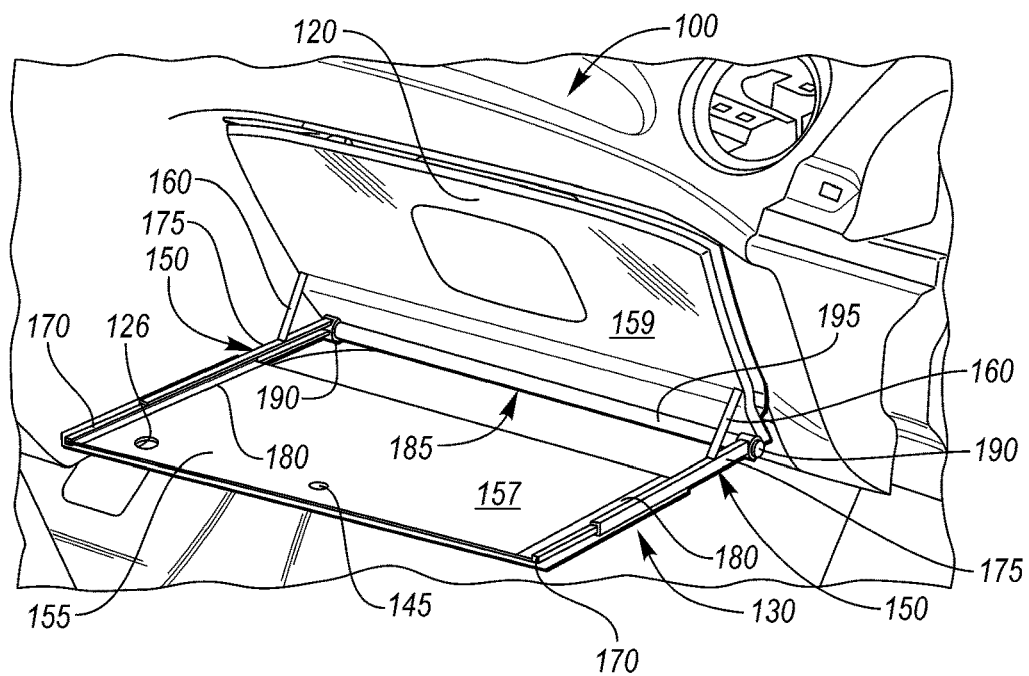
FIG. 3 is a perspective view of the glove box assembly of FIG. 1 having a door of the door assembly in a closed position and the tray assembly in a deployed position.

FIG. 2 is a perspective view of the glove box assembly 100 of FIG. 1 having the door assembly 105 in a closed position and the tray assembly 130 in a stored position. The door assembly 105, as explained, may include the tray assembly 130. The tray assembly 130 may include a tray 155 having a face 140, which, when in the closed position, is visible to a passenger. The face 140 may be configured to cover the door 120 of the door assembly 105 and is generally in alignment with rearward facing surface the dash board to achieve an aesthetically pleasing appearance when the door assembly 105 is in a closed position. The tray 155 is adapted to be released from the door assembly 105, as shown in FIG. 3.

The tray assembly 130 may include a door release mechanism 126 arranged on the face 140 of the tray 155, similar to the door release mechanism 125 of FIG. 1. The door release mechanism 126 may extend from the face 140 of the tray, through the door 120, and include a latch configured to engage a portion of the compartment 110 and maintain the door assembly 105, including the tray 155 and the door 120, in the closed position. The door release mechanism 126 may be a push-push latch or a push-release mechanism that is activated by applying pressure to the mechanism to release the engagement of the door assembly 105 with the compartment 110 to open the door assembly 105.

In the example shown in FIG. 2, where the door release mechanism 126 is arranged on the face 140 of the tray 155, the door release mechanism 126 may release the door assembly 105, including both the tray 155 and the door 120, permitting access to the compartment 110. The door release mechanism 126 permits the user to open the door assembly 105 with a single actuation. The existing hidden push-push release and locking mechanism for a typical glove box can also be used with the proposed tray integrated glove box door design.

The tray assembly 130 may include a tray release mechanism 145. The location of tray release mechanism 145 can be conveniently positioned for ease of use and also for interior styling. In one scenario, tray release mechanism 145 may be positioned at upper right corner when the glove box door release mechanism 126 is positioned at the upper left corner. The tray release mechanism 145 may be configured to release the tray assembly 130 from a stored position to a deployed position. In the stored position the tray assembly 130 may be fixed to the door 120. In a deployed position, the tray assembly 130 may be released from the door 120, while the door 120 is in a closed position, thus closing the compartment 110.

The tray release mechanism 145 may be similar to the door release mechanisms 125, 126 such that the tray release mechanism 145 may be a push-push button/latch or a push-release mechanism whereby applying pressure to the tray release mechanism 145 releases the engagement with the door 120, allowing the tray assembly 130 to deploy from the door 120. In one example, the latch release mechanism may be configured to release the door assembly, thereby allowing the door 120 to open. An alternative design for tray release mechanism 145 may be a sliding locking and release mechanism. In this case a small laterally sliding knob can be used to open and lock the tray assembly with the door 120.

FIG. 3 illustrates a perspective view of the glove box assembly 100 of FIG. 1 having the door 120 of the door assembly 105 in a closed position and the tray assembly 130 in a deployed position. The tray assembly 130 may include a tray 155 configured to provide a flat interior surface 157 when the tray assembly 130 is pivoted downwardly from the door assembly 105. The opposite side of the tray 155 (e.g., the face 140) may be configured to provide the aesthetically appealing face for the glove box assembly 100 when the tray assembly 130 is in an installed position. The flat surface 157 may allow a passenger within the vehicle to place an item on the surface, such as a laptop, tablet, book, etc. The flat surface 157 may also provide a writing surface for the passenger. In the stored state, the flat surface 157 may abut an outer surface 159 of the door.

The tray assembly 130 may include a pair of tracks 150 arranged at each side of the tray assembly 130. The tracks 150 may permit the tray 155 of the tray assembly 130 to be expanded and retracted relative to the glove box assembly 100 when the tray assembly 130 is in a deployed state. The tracks 150 may permit the tray 155 to slide laterally respective to the door assembly 105 in order to allow a passenger to laterally adjust the tray.

Each track may include a carrier glide 170 attached to the tray 130. Each track 150 may also include a guide bracket 175 configured to maintain the carrier glide 170 therein. The carrier glide 170 may be movable along the bracket 175 such that the carrier glide 170 may slide within the bracket 175, allowing the tray attached to the carrier glide 170 to be expanded and retracted. Each track 150 may include a stop (not shown) to prevent the carrier glide 170 from fully extending from the bracket 175.

The carrier glide 170 may be connected or attached to the tray 155 via a support 180. The support 180 may attach to the carrier glide 170 and provide a linear offset between the carrier glide 170 and the tray 155 allowing the tray 155 to be arranged in front of, or under the tracks 150. By offsetting the tray 155 from the carrier glide 170 via the support 180, the tray 155 may extend past the tracks 150 so that the tracks are arranged behind the tray 155 when the tray assembly 130 is in a stored position. That is, the tracks 150 may be 'hidden' and invisible when the tray 155 is in the stored position, increasing the aesthetic appearance of the tray assembly 130. The grooves may be provided on both sides of the glove box door 120 to house the tray extension tracks 150 in stowed position. This may minimize the added thickness of the glove box door 120 due to the addition of the tray assembly 130.

The tray assembly 130 may be connected to the glove box assembly 100 by a hinge mechanism 185. The hinge mechanism 185 may be arranged at a base, or at the bottom, of the glove box assembly 100. In one example, both the tray assembly 130 and the door 120 may be pivotable about the hinge mechanism 185. The track 150 may be rotatable about the hinge mechanism 185 at a junction 190. The junction 190 may include a cylindrical bracket arranged on and movable about a rod 195 of the hinge mechanism 185. The hinge mechanism 185 may also include a roller pin assembly. The hinge mechanism 185 is designed such that it may lock after the tray 155 pivots down to horizontal open position. Alternatively, stowable links 160, or short cables, shown in FIG. 3 can also be used to hold the tray 155 in horizontal position.

Accordingly, a glove box assembly including a door assembly having a tray configured to deploy and extend outward from the door assembly is disclosed herein. The tray may provide a flat surface for a passenger of the vehicle to place objects on, write on, etc. The tray may be adjustable in the lateral direction. The tray may have an outer surface that is designed to blend in with or compliment the appearance of the dash board. The tray may provide for a smooth, aesthetically pleasing appearance whereby the tray is arranged in front of the tracks that permit lateral movement when the tray is in a deployed state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tray assembly for a vehicle storage compartment, comprising:
 a tray arranged on a storage compartment door;
 a hinge connecting the tray to the door to pivot relative to the door between a stored position with an interior tray surface facing an outer surface of the door to a horizontal position; and
 a release mechanism configured to disengage the tray assembly from the door.

2. The tray assembly of claim 1, further comprising a track arranged on each side of the tray for shifting the tray horizontally toward and away from the outer surface of the door.

3. The tray assembly of claim 2, wherein the track includes a guide bracket and a carrier glide, the tray attached to the carrier glide and configured to be movable within the guide bracket.

4. The tray assembly of claim 3, the tray assembly including a support attached to the carrier glides and the tray to offset the tray from the track and arrange the tray in front of the track in a stored position.

5. The tray assembly of claim 1, wherein the release mechanism includes a push-push button.

6. The tray assembly of claim 1, wherein the release mechanism includes a latch.

7. A vehicle compartment door assembly, comprising:
a door arranged on a vehicle storage compartment and moveable between open and closed positions;
a tray assembly arranged on and hinged to the door and pivotable with respect to the door to provide a flat surface in a deployed position relative to the door; and
a push-push button configured to disengage the tray assembly from the door.

8. The assembly of claim 7, the tray assembly including a tray and a track arranged on each side of the tray, the tray slidable with each track and extendable and retractable in the deployed position.

9. The assembly of claim 8, the track including a guide bracket and a carrier glide, the tray attached to the carrier glide and configured to be movable within the guide bracket.

10. The assembly of claim 9, the tray assembly including a support attached to the carrier glides and the tray to offset the tray from the track and arrange the tray in front of the track in a stored position.

11. A vehicle storage compartment door assembly, comprising:
a door assembly for a storage compartment including a door arranged on the compartment and moveable between open and closed positions;
the door assembly further including a tray assembly including a track arranged on each side of a tray, the tray slidable with each track and extendable and retractable in a deployed position to provide a flat surface in the deployed position relative to the door, the track including a guide bracket and a carrier glide, the tray attached to the carrier glide and configured to be movable within the guide bracket, the tray assembly including a support attached to the carrier glides and the tray to offset the tray from the track and arrange the tray in front of the track in a stored position.

* * * * *